(12) United States Patent
Bickham et al.

(10) Patent No.: US 9,057,814 B2
(45) Date of Patent: Jun. 16, 2015

(54) LARGE EFFECTIVE AREA FIBER WITH LOW BENDING LOSSES

(71) Applicant: Corning Incorporated, Corning, NY (US)

(72) Inventors: Scott Robertson Bickham, Corning, NY (US); Snigdharaj Kumar Mishra, Wilmington, NC (US); Manuela Ocampo, Corning, NY (US); Joan Diana Patterson, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/189,182

(22) Filed: Feb. 25, 2014

(65) Prior Publication Data

US 2014/0294355 A1    Oct. 2, 2014

Related U.S. Application Data

(60) Provisional application No. 61/806,005, filed on Mar. 28, 2013.

(51) Int. Cl.
  *G02B 6/02* (2006.01)
  *G02B 6/36* (2006.01)
  *G02B 6/036* (2006.01)

(52) U.S. Cl.
  CPC ........ *G02B 6/02019* (2013.01); *G02B 6/02395* (2013.01); *G02B 6/03627* (2013.01)

(58) Field of Classification Search
  CPC ........... G02B 6/02019; G02B 6/03627; G02B 6/02395
  USPC ........................................... 385/128, 129, 130
  See application file for complete search history.

(56) References Cited

U.S. PATENT DOCUMENTS

| | | | |
|---|---|---|---|
| 7,844,155 B2 * | 11/2010 | Bickham et al. ............... | 385/126 |
| 8,145,027 B2 | 3/2012 | Overton et al. ............... | 385/128 |
| 8,265,442 B2 | 9/2012 | Overton et al. ............... | 385/128 |
| 8,315,495 B2 | 11/2012 | Bickham et al. ............... | 385/128 |
| 2005/0063663 A1 * | 3/2005 | Anderson et al. ............. | 385/142 |
| 2010/0195194 A1 * | 8/2010 | Chen et al. ................. | 359/341.3 |
| 2010/0195966 A1 | 8/2010 | Bickham et al. | |

(Continued)

FOREIGN PATENT DOCUMENTS

| | | |
|---|---|---|
| EP | 1107027 | 6/2001 |
| EP | 2362252 | 8/2011 |
| WO | 2013/028513 | 2/2013 |

*Primary Examiner* — Akm Ullah
(74) *Attorney, Agent, or Firm* — Kevin L. Bray

(57) ABSTRACT

A fiber having a large effective area at 1550 nm of at least 130 μm² and a wire mesh drum microbending loss of less than 0.4 dB/km at a wavelength of 1550 nm. The fibers may include a core, a cladding, and a coating. The core may include a central core region and a surrounding first core region. The cladding may include a depressed index inner cladding region and an outer cladding region. The coating may include a primary coating surrounding the cladding and a secondary coating surrounding the primary coating. The primary coating may be formed from a primary composition that may include an acrylate monomer or an N-vinyl amide monomer in combination with an acrylate oligomer, where the acrylate oligomer is present at 35 wt % to 55 wt %. The secondary coating may be formed from a secondary composition including one or more acrylate or diacrylate monomers and an acrylate or methacrylate oligomer, where the oligomer is present at 3 wt % or less.

21 Claims, 6 Drawing Sheets

(56) References Cited

U.S. PATENT DOCUMENTS

| | | | |
|---|---|---|---|
| 2012/0263427 A1* | 10/2012 | Hirano et al. | 385/142 |
| 2013/0034654 A1* | 2/2013 | Haruna et al. | 427/163.2 |
| 2013/0188917 A1* | 7/2013 | Hirano et al. | 385/127 |
| 2014/0195194 A1* | 7/2014 | Brill et al. | 702/155 |
| 2014/0294355 A1* | 10/2014 | Bickham et al. | 385/128 |

* cited by examiner

LARGE EFFECTIVE AREA FIBER WITH LOW BENDING LOSSES

This application claims the benefit of priority under 35 U.S.C. §119 of U.S. Provisional Application Ser. No. 61/806,005 filed on Mar. 28, 2013 the content of which is relied upon and incorporated herein by reference in its entirety.

FIELD

The present disclosure relates generally to optical fibers, and particularly to optical fibers with large effective area and low microbending losses.

TECHNICAL BACKGROUND

Optical amplifier technology and wavelength division multiplexing techniques are typically required in telecommunication systems that provide high power transmissions for long distances. The definition of high power and long distances is meaningful only in the context of a particular telecommunication system in which a bit rate, a bit error rate, a multiplexing scheme, and perhaps optical amplifiers are specified. There are additional factors, known to those skilled in the art, which have impacted upon the definition of high power and long distance. However, for most purposes, high power is an optical power greater than about 10 mW. High power systems often suffer from non-linear optical effects, including self-phase modulation, four-wave-mixing, cross-phase modulation, and non-linear scattering processes, all of which can cause degradation of signals in high powered systems. In some applications, optical power levels of 1 mW or less are sensitive to non-linear effects, so non-linear effects may still be an important consideration in low power systems. In addition, other optical fiber attributes, such as attenuation, contribute to the degradation of the signal.

Generally, an optical waveguide fiber having a large effective area ($A_{eff}$) reduces signal-degrading non-linear optical effects, including self-phase modulation, four-wave-mixing, cross-phase modulation, and non-linear scattering processes. Increasing the effective area of an optical waveguide fiber, however, typically results in an increase in macrobending- and microbending-induced losses, which attenuate signal transmission through a fiber. The need for low microbending losses become increasingly important over long transmission distances (e.g. 100 km or more) and in systems with large spacing between regenerators, amplifiers, transmitters and/or receivers. It would be desirable to develop an optical fiber having a large effective area ($A_{eff}$) with low bending losses.

SUMMARY

This disclosure provides optical fibers having a large effective area ($A_{eff}$) and low bending losses. The fibers may include a core region, a cladding region, and a coating. The core region may include a central core region and a surrounding core region. The cladding region may include an inner cladding region with a first refractive index and an outer cladding region with a second refractive index profile. The coating may include a primary coating surrounding the cladding and a secondary coating surrounding the primary coating. The in situ modulus of the primary coating may be lower than the in situ modulus of the secondary coating.

The radius $r_0$ of the central core region may be less than or equal to 2 µm. The outer radius $r_1$ of the surrounding core region may be between 4 µm and 10 µm. The outer radius $r_2$ of the inner cladding region may be between 16 µm and 30 µm.

Materials used for the core and cladding regions include silica, silica modified with an alkali metal or alkaline earth metal, and/or doped silica. The core region may include Ge-free silica. The central core region may include Ge-free silica and the surrounding core may include doped silica. The surrounding core region may include a first region containing silica with a first dopant and a second region containing silica with a second dopant. The surrounding core region may include a first region containing silica with a first dopant at a first concentration and a second region containing silica with the first dopant at a second concentration. Dopants may include elements that act to increase or decrease the refractive index of a core region relative to pure silica. Representative dopants include halides (e.g. Cl, Br, F), metals (e.g. Al, Ti, transition metals), Ge, and P. These dopants or other dopants such as alkali metals (e.g. K, Na) may be used to modify the viscosity of the core region relative to pure silica.

The cladding may have a refractive index less than the refractive index of the core region. The cladding may include an inner cladding region and an outer cladding region, where the refractive index of the inner cladding region is less than the refractive index of the outer cladding region.

The relative refractive index profile across the core and cladding regions of the optical fibers may be selected to provide an attenuation of less than 0.195 dB/km at 1550 nm, a mode field diameter of greater than 12.4 µm at 1550 nm and/or a cable cutoff wavelength of less than 1530 nm. The mode field diameter at 1550 nm may be greater than 13.2 µm, or 13.6 µm, or 13.8 µm.

The primary coating may be formed from a curable primary composition having a short gel time. The curable primary composition may include acrylate, substituted acrylate, or vinyl-substituted amide monomers. The curable primary composition may further include an oligomer. The oligomer may be a urethane acrylate oligomer. The urethane acrylate oligomer may include an isocyanate group. The urethane acrylate oligomer may include a single isocyanate. The urethane acrylate oligomer may include an isocyanate group and an alcohol group.

The in situ modulus of the primary coating may be less than 0.2 MPa, or less than 0.15 MPa, or less than 0.12 MPa, or less than 0.10 MPa.

The in situ glass transition temperature ($T_g$) or the primary coating may be less than −20° C., or less than −30° C., or less than −40° C., or less than −45° C.

The outer diameter of the primary coating may be less than 195 µm, or less than 190 µm, or less than 185 µm, or less than 180 µm.

The secondary coating may be formed from a curable secondary composition that includes a one or more alkene monomers, where the alkene monomers may include one or multiple alkene groups. Representative alkene monomers include acrylates, substituted acrylates, alkyl acrylates, alcohol-based acrylates, vinyl-substituted amides, styrenes, vinyl ethers, vinyl esters, and acid esters. The alkene monomer may be a polyacrylate or an alkoxylated polyacrylate.

The secondary coating may have a higher in situ modulus than the primary coating. The in situ modulus of the secondary coating may be greater than 1200 MPa, or greater than 1400 MPa, or greater than 1500 MPa, or greater than 1600 MPa.

The outer diameter of the secondary coating may be less than 250 µm, or less than 240 µm.

Optical fibers having one or more of the foregoing attributes may further exhibit low bending losses. The optical fiber may exhibit a microbending loss at a wavelength of 1550 nm, as measured by a wire mesh drum test, of less than 0.4 dB/km, or less than 0.3 dB/km, or less than 0.2 dB/km, or less than 0.1 dB/km at a wavelength of 1550 nm.

The optical fiber may comprise one or more of the following features:
   a core having a radius $r_1$ in the range 4 µm≤$r_1$≤10 µm and a relative refractive index percent profile $\Delta_1(r)$ in % measured relative to pure silica, said relative refractive index percent profile $\Delta_1(r)$ having a maximum $\Delta_{1MAX}$ in the range −0.15%≤$\Delta_{1MAX}$≤0.1%;
   a cladding;
   a primary coating surrounding and directly adjacent said cladding, said primary coating having an in situ modulus of less than 0.2 MPa and an in situ glass transition temperature of less than −40° C.; and
   a secondary coating surrounding and directly adjacent to said primary coating, said secondary coating having an in situ modulus of greater than 1200 MPa;
   wherein said relative refractive index percent profiles $\Delta_1(r)$ and said primary and secondary coatings are configured such that said optical waveguide fiber exhibits a mode field diameter greater than 12.4 µm at a wavelength of 1550 nm and a wire mesh drum microbending loss less than 0.4 dB/km at a wavelength of 1550 nm.

DETAILED DESCRIPTION

Figure 1:
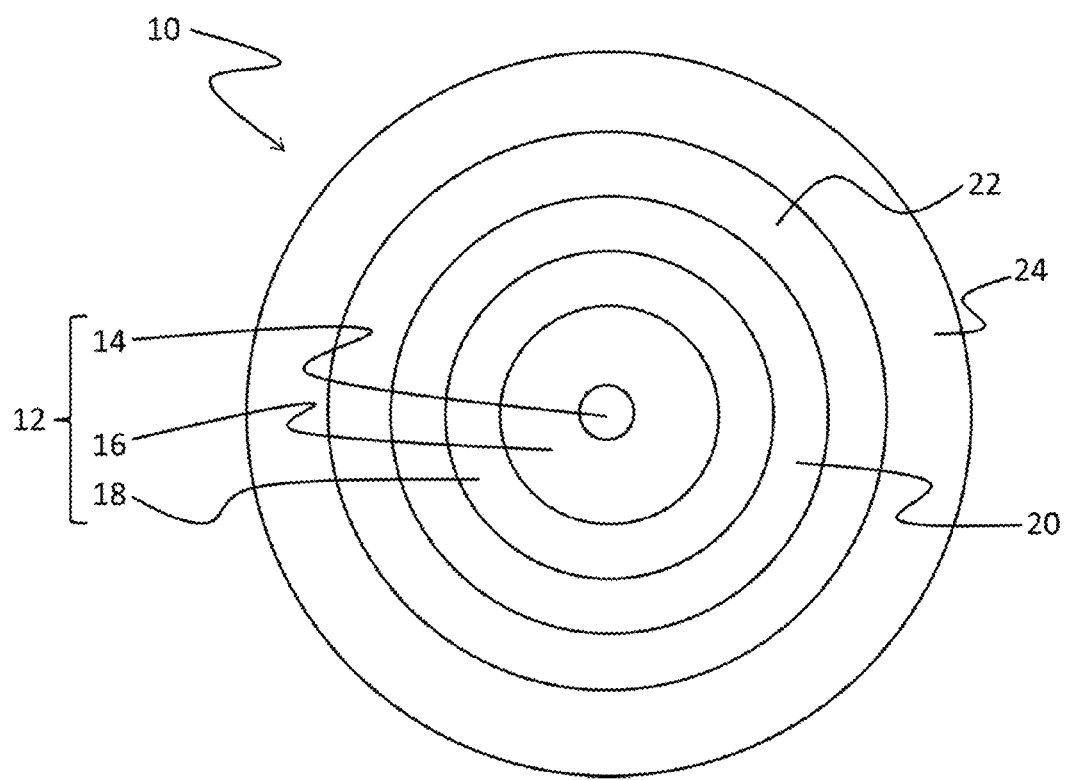
FIG. 1 is a cross-sectional view of a fiber having a central core region, a first surrounding core region, a second surrounding core region, and a cladding region.

Additional features and advantages of the exemplary embodiments herein will be set forth in the detailed description that follows, and in part will be readily apparent to those skilled in the art from that description or recognized by practicing the embodiments as described herein, including the detailed description which follows, the abstract, the claims, as well as the appended drawings.

It is to be understood that both the foregoing general description and the following detailed description of the exemplary embodiments, and are intended to provide an overview or framework for understanding the nature and character of the scope of disclosure as it is claimed. The accompanying drawings are included to provide a further understanding of the exemplary embodiments, and are incorporated into and constitute a part of this specification. The drawings illustrate selected exemplary embodiments of the disclosure and together with the description serve to explain the principles and operations of the exemplary embodiments. Features shown in the drawing are illustrative of selected exemplary embodiments of the present disclosure and are not necessarily depicted in proper scale.

An explanation of selected terms as used herein is now provided:

The "refractive index profile" is the relationship between refractive index or relative refractive index and fiber radius.

The "relative refractive index percent" is defined as $$\Delta\% = 100\frac{n^2(r) - n_s^2}{2n^2(r)}$$

where n(r) is the refractive index of the fiber at the radial distance r from the fiber's centerline, unless otherwise specified, and $n_s$ is 1.444, the refractive index of silica at a wavelength of 1550 nm. As used herein, the relative refractive index is represented by Δ (or "delta") or Δ% (or "delta %") and its values are given in units of "%", unless otherwise specified.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers, the inter-modal dispersion is zero. Dispersion values in a two-mode regime assume intermodal dispersion is zero. The zero dispersion wavelength ($\lambda_0$) is the wavelength at which the dispersion has a value of zero. Dispersion slope is the rate of change of dispersion with respect to wavelength.

"Effective area" is defined as:

$$A_{eff} = \frac{2\pi\left[\int_0^\infty (f(r))^2 r\,dr\right]^2}{\int_0^\infty (f(r))^4 r\,dr}$$

where f(r) is the transverse component of the electric field of the guided light. As used herein, "effective area" or "$A_{eff}$" refers to the effective area at a wavelength of 1550 nm unless otherwise noted.

The term "α-profile" refers to a relative refractive index profile, expressed in terms of Δ(r) which is in units of "%", where r is the radius relative to the centerline of the fiber, which follows the equation, $$\Delta(r) = \Delta(r_0)\left[1 - \left[\frac{|r - r_0|}{(r_1 - r_0)}\right]^\alpha\right]$$

where $r_0$ is the point at which Δ(r) is maximum, $r_1$ is the point at which Δ(r)% is zero, and r is in the range $r_i \le r \le r_f$, where Δ(r) is defined above, $r_i$ is the initial point of the α-profile, $r_f$ is the final point of the α-profile, and α0 is an exponent which is a real number.

The mode field diameter (MFD) is measured using the Petermann II method and was determined from:

$$MFD = 2w$$

$$w^2 = 2 \frac{\int_0^\infty (f(r))^2 r \, dr}{\int_0^\infty \left(\frac{df(r)}{dr}\right)^2 r \, dr}$$

where f(r) is the transverse component of the electric field distribution of the guided light and r is radial position in the fiber.

The bend resistance of a waveguide fiber can be gauged by induced attenuation under prescribed test conditions. Various tests are used to assess bending losses including the wire mesh drum test for measuring microbending losses and the mandrel wrap test for measuring macrobending losses. Microbending losses represent losses in guided light intensity caused by perturbations (e.g. stresses, strains, forces) to the fiber that occur over short length scales (e.g. 1 mm or less). Macrobending losses represent losses in guided light intensity caused by perturbations (e.g. stresses, strains, forces) to the fiber that occur over long length scales (e.g. 5 mm or greater).

In the wire mesh covered drum microbend test (WMCD), a 400 mm diameter aluminum drum is wrapped with wire mesh. The mesh is wrapped tightly without stretching, and should have no holes, dips, or damage. The wire mesh material was made from corrosion-resistant type 304 stainless steel woven wire cloth and had the following characteristics: mesh per linear inch: 165×165, wire diameter: 0.0019", width opening: 0.0041", and open area %: 44.0. A prescribed length (750 m) of waveguide fiber is wound at 1 m/s on the wire mesh drum at 0.050 cm take-up pitch while applying 80 (+/−1) grams of tension. The ends of the prescribed length of fiber are taped to maintain tension and there are no fiber crossovers. The attenuation of the optical fiber is measured at a selected wavelength (typically within the range of 1200-1700 nm, e.g., 1310 nm or 1550 nm or 1625 nm). A reference attenuation is measured for the optical fiber wound on a smooth drum. The increase in attenuation (in dB/km) is the wire mesh covered drum attenuation of the waveguide at the selected wavelength.

In the mandrel wrap test, the fiber is wrapped around a mandrel having a specified diameter and the increase in attenuation due to the bending is determined. Attenuation in the mandrel wrap test is expressed in units of dB/turn, where one turn refers to one revolution of the fiber about the mandrel.

The fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cable cutoff" (also known as the "22-meter cutoff") is typically lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards (Electronics Industry Alliance—Telecommunications Industry Association Fiber Optics Standards, more commonly known as FOTP's). Cable cutoff measurement is described in EIA-455-170 Cable Cutoff Wavelength of Single-mode Fiber by Transmitted Power, or "FOTP-170". Unless otherwise noted herein, optical properties (such as dispersion, dispersion slope, etc.) are reported for the LP01 mode.

The present disclosure provides large effective area fibers with low attenuation losses and low microbending losses. The present fibers may include a core, a cladding surrounding the core, a primary coating surrounding the cladding, and a secondary coating surrounding the primary coating. The core may include a central core region and one or more surrounding annular regions. The refractive index profile of the core may be designed to minimize attenuation losses while maintaining a large effective area for the fiber. The primary and secondary coatings may be selected to protect the mechanical integrity of the core and cladding and to minimize the effects of external mechanical disturbances on the characteristics of the light guided in the fiber. The primary and secondary coatings may insure that losses due to bending and other perturbing forces are minimized. Reference will now be made in detail to the selected illustrative embodiments of the disclosure. Whenever possible, the same reference numerals will be used throughout the drawings to refer to the same or like parts.

An exemplary optical fiber is shown in FIG. 1. Optical waveguide fiber 10 includes core 12, inner cladding 18, outer cladding 20, primary coating 22, and secondary coating 24. In FIG. 1, core 12 includes central core region 14 and first core region 16. Core 12 may, however, exclude central core one region 14. First core region 16, inner cladding region 18, outer cladding region 20, primary coating 22, and secondary coating 24 may be annular.

The core and cladding are silica-based glass and may optionally include an updopant or a downdopant. The silica-based glass may be silica glass modified by an alkali or alkaline earth element. Doping or compositional modifications may provide control over the refractive index profile across the core and cladding regions in a manner that facilitates reduction of attenuation and/or bending losses. The core may lack Ge.

Core 12 may result in the fiber having an effective area at a wavelength of 1550 nm greater than 90 $\mu m^2$, or greater than 120 $\mu m^2$, or greater than 130 $\mu m^2$, or greater than 135 $\mu m^2$, or greater than 140 $\mu m^2$, or greater than 150 $\mu m^2$.

The relative refractive index percent profile of core 12 may be an α-profile with an α value in the range 12≤α≤100, or in the range 12≤α≤20, or in the range 4≤α≤12, or in the range 1≤α≤12, or in the range 1≤α≤6. Larger α values (e.g., >20) may be achieved by processes such as plasma chemical vapor deposition (PCVD).

Central core region 14 may extend radially outwardly from a centerline to a radius $r_0$ and may have a relative refractive index percent profile $\Delta_0(r)$ with a maximum relative refractive index percent, $\Delta_{0MAX}$. The first core region 16 may extend to an outer radius $r_1$ and may have a relative refractive index percent profile $\Delta_1(r)$ with a minimum relative refractive index percent $\Delta_{1MIN}$, and a maximum relative refractive index percent $\Delta_{1MAX}$. The inner cladding region 18 may be directly adjacent to the first core region 16. The inner cladding region 18 may extend to a radius $r_2$ and may have a relative refractive index percent profile $\Delta_2(r)$ with a maximum relative refractive index percent $\Delta_{2MAX}$ and a minimum relative refractive index percent $\Delta_{2MIN}$. The outer cladding region 20 surrounds the core 12 and may have a relative refractive index percent profile $\Delta_3(r)$.

Whenever used herein, radius $r_0$ and relative refractive index percent profile $\Delta_0(r)$ refer to central core region 14, radius $r_1$ and relative refractive index percent profile $\Delta_1(r)$ refer to first core region 16, radius $r_2$ and relative refractive index percent profile $\Delta_2(r)$ refer to inner cladding region 18, and radius $r_3$ and relative refractive index percent profile $\Delta_3(r)$ refer to cladding 20. Radial positions $r_0$, $r_1$, $r_2$, and $r_3$ refer to the outermost radius of regions 14, 16, 18, and 20, respectively.

Figure 2A:
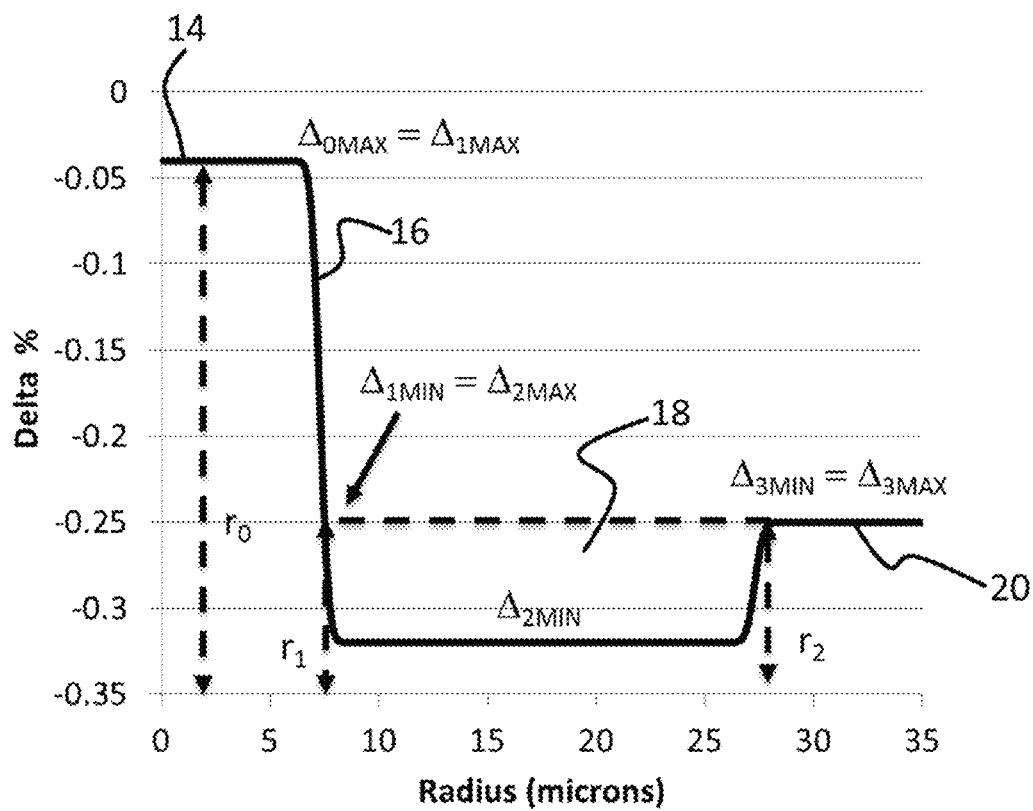
FIG. 2A schematically depicts an exemplary relative refractive index profile of a fiber having the design of FIG. 1 in an embodiment in which $\Delta_{0MAX}=\Delta_{1MAX}$, $\Delta_{1MIN}=\Delta_{2MAX}$, and $\Delta_{3MIN}=\Delta_{3MAX}$.
Figure 2B:
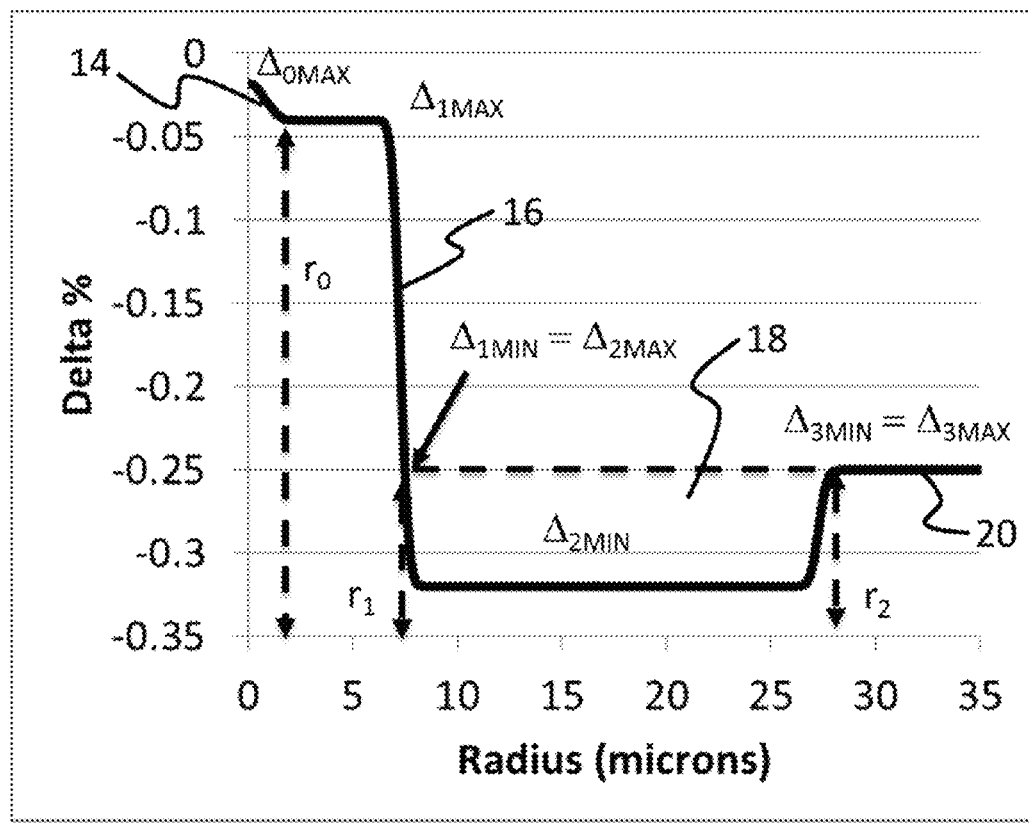
FIG. 2B schematically depicts an exemplary relative refractive index profile of a fiber having the design of FIG. 1 in an embodiment in which $r_0>0$, $\Delta_{0MAX}>\Delta_{1MAX}$, $\Delta_{1MIN}=\Delta_{2MAX}$ and $\Delta_{3MIN}=\Delta_{3MAX}$.
Figure 2C:
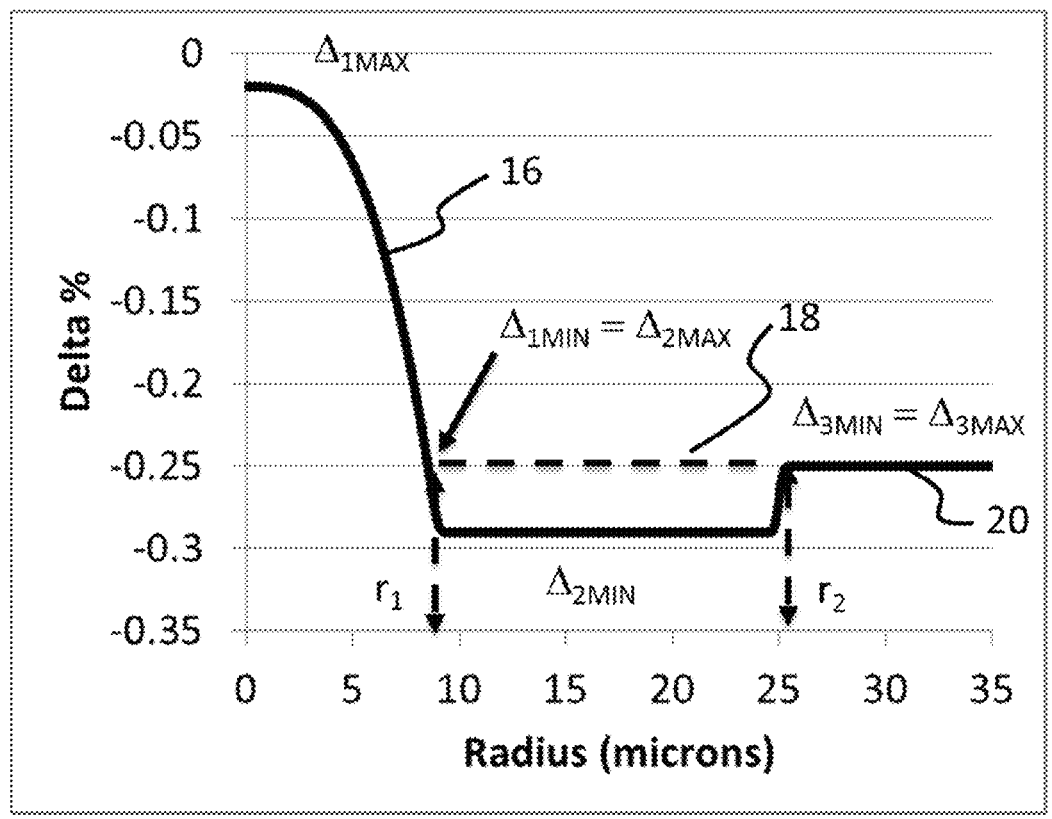
FIG. 2C schematically depicts an exemplary relative refractive index profile of a fiber having the design of FIG. 1 in an embodiment in which $r_0=0$, $\Delta_{1MAX}$ occurs at or near the center of the fiber, $\Delta_{1MIN}=\Delta_{2MAX}$ and $\Delta_{3MIN}=\Delta_{3MAX}$.
Figure 2D:
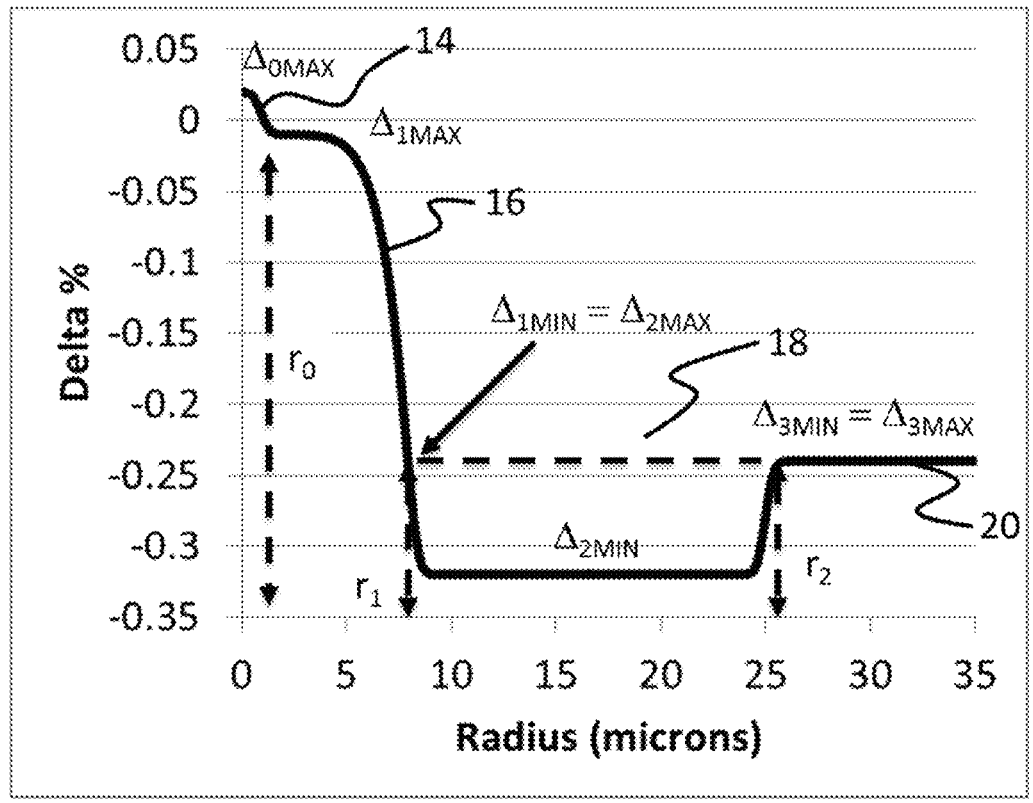
FIG. 2D schematically depicts an exemplary relative refractive index profile of a fiber having the design of FIG. 1 in an embodiment in which $r_0>0$, $\Delta_{1MAX}$ occurs at $r<r_1$, $\Delta_{1MIN}=\Delta_{2MAX}$ and $\Delta_{3MIN}=\Delta_{3MAX}$.

An exemplary refractive index profiles (relative refractive index $\Delta$ vs. radius) of fibers in accordance with the instant disclosure are shown schematically in FIGS. 2A-2D. FIG. 2A depicts an exemplary relative refractive index profile of a fiber having a design in which $\Delta_{0MAX}=\Delta_{1MAX}$, $\Delta_{1MIN}=\Delta_{2MAX}$, and $\Delta_{3MIN}=\Delta_{3MAX}$. FIG. 2B depicts an exemplary relative refractive index profile of a fiber having a design in which $r_0>0$, $\Delta_{0MAX}>\Delta_{1MAX}$, $\Delta_{1MIN}=\Delta_{2MAX}$ and $\Delta_{3MIN}=\Delta_{3MAX}$. FIG. 2C depicts an exemplary relative refractive index profile of a fiber having a design in which $r_0=0$, $\Delta_{1MAX}$ occurs at or near the center of the fiber, $\Delta_{1MIN}=\Delta_{2MAX}$ and $\Delta_{3MIN}=\Delta_{3MAX}$. FIG. 2D depicts an exemplary relative refractive index profile of a fiber having a design in which $r_0>0$, $\Delta_{MAX}$ occurs at $r<r_1$, $\Delta_{1MIN}=\Delta_{2MAX}$ and $\Delta_{3MIN}=\Delta_{3MAX}$.

The central core region 14 has a radius $r_0$ that may be in the range $0~\mu m \le r_0 \le 2~\mu m$. The relative refractive index percent profile $\Delta_0(r)$ of central core region 14 may be such that $-0.2\% \le \Delta_0(r) \le 0.2\%$, or $-0.2\% \le \Delta_0(r) \le 0.1\%$, or $-0.1\% \le \Delta_0(r) \le 0.15\%$, or $-0.1\% \le \Delta_0(r) \le 0.1\%$, or $-0.1\% \le \Delta_0(r) \le 0.05\%$, or $-0.1\% \le \Delta_0(r) \le 0\%$, or $-0.075\% \le \Delta_0(r) \le 0\%$. $\Delta_{0MAX}$ may occur at or near the centerline of the fiber.

The first core region 16 has a radius $r_1$ that may be in the range $4~\mu m \le r_1 \le 10~\mu m$. The radius $r_1$ may be defined as the first radius moving radially outward from the centerline (r=0) at which $\Delta(r)=\Delta_{3max}$. The relative refractive index percent profile $\Delta_1(r)$ of first core region 16 may be such that $\Delta_{0MAX}>\Delta_{1MAX}$ and/or $\Delta_{1MIN} \le -0.1\%$, or $-0.1\% \le \Delta_{1MAX} \le 0\%$ and/or $-0.3\% \le \Delta_{1MIN} \le -0.1\%$, or $-0.3\% \le \Delta_{1MIN} \le -0.2\%$, or $-0.27\% \le \Delta_{1MIN} \le -0.23\%$, or $-0.15\% \le \Delta_{1MAX} \le 0.1\%$, $-0.15\% \le \Delta_{1MAX} \le 0.2\%$. When $r_0=0$, first core region 16 fully occupies the central portion of the fiber.

The inner cladding region 18 has a radius $r_2$ that may be in the range $16~\mu m \le r_2 \le 30~\mu m$, or $20~\mu m \le r_2 \le 30~\mu m$. The radius $r_2$ may be defined as the second radius moving radially outward from the centerline (r=0) at which $\Delta(r)=\Delta_{3max}$, where $r_2>r_1$. The ratio $r_1/r_2$ may be such that $0.2 \le r_1/r_2 \le 0.3$. The relative refractive index percent profile $\Delta_2(r)$ of inner cladding region 18 may be such that $-0.7\% \le \Delta_{2MIN} \le -0.27\%$, or $-0.5\% \le \Delta_{2MIN} \le -0.27\%$, or $-0.4\% \le \Delta_{2MIN} < -0.27\%$, or $\Delta_{2MIN}<\Delta_{1MIN}$ and/or $\Delta_{2MAX}=\Delta_{1MIN}$. For example, $\Delta_{2MIN}$ may be $-0.29\%$, $-0.3\%$, $-0.35\%$, $-0.38\%$, $-0.4\%$, $-0.47\%$, $-0.5\%$, or any number therebetween. Inner cladding region may be regarded as a depressed index region, trench region, or moat region of the fiber refractive index profile.

To achieve a negative relative refractive index profile, inner cladding region 18 may be downdoped or compositionally modified. Suitable downdopants include fluorine and boron. The downdopant may be fluorine and inner cladding region 18 may be doped with 0.1 to 2 wt % fluorine, or 0.1 to 1.6 wt % fluorine, or 0.4 to 2 wt % fluorine.

The relative refractive index percent profile $\Delta_3(r)$ of outer cladding region 20 may be such that $\Delta_3(r) \ge \Delta_{2MIN}$ for all $r>r_2$, or $\Delta_{2MIN} \le \Delta_3(r) \le \Delta_{2MIN}+0.2\%$, or $-0.4\% \le \Delta_{3MIN} \le -0.2\%$, or $-0.4\% \le \Delta_{3MIN} \le -0.3\%$, or $-0.4\% \le \Delta_{3MAX} \le -0.2\%$, or $-0.3\% \le \Delta_{3MAX} \le -0.2\%$.

Further information about refractive index percent profiles in accordance with the present disclosure can be found in U.S. Pat. No. 8,315,495, the disclosure of which is hereby incorporated in its entirety herein.

The core 12, inner cladding region 18, and/or outer cladding region 20 may include F as a downdopant. The concentration of F present in the first core region 16 and inner cladding region 18 may be greater than the amount of fluorine present in the central core region 14. The core 12 may also include at least one alkali metal oxide modifier, where the alkali is K, Na, Li, Cs, and/or Rb. The core 12 may, for example, contain $K_2O$ in an amount from 20 ppm to 1000 ppm by weight of K. Fiber 10 may also include chlorine. It is noted that the term "ppm", unless otherwise specially noted otherwise, refers to parts per million by weight, or ppm by weight, and a measurement on wt % can be converted to ppm by multiplying by a factor of 10,000.

The relative refractive index profile across the core and cladding regions of optical fiber 10 may be selected to provide attenuation at the wavelength $\lambda$ of 1550 nm of no more than 0.195 dB/km, or no more than 0.175 dB/km, or no more than 0.170 dB/km, or no more than 0.165 dB/km. Attenuation values at 1550 nm include, for example, 0.150 dB/km, 0.155 dB/km, 0.160 dB/km, 0.165 dB/km, or 0.170 dB/km.

The relative refractive index profile across the core and cladding regions of optical fiber 10 may also be selected to provide a mode field diameter at a wavelength of 1550 nm greater than 12.4 μm, or greater than 13.2 μm, or greater than 13.6 μm, or greater than 13.8 μm.

The relative refractive index profile across the core and cladding regions of optical fiber 10 may also be selected to provide a cable cutoff wavelength of less than 1530 nm, or less than 1500 nm, or less than 1475 nm, or less than 1450 nm.

The relative refractive index profile across the core and cladding regions of the optical fibers of the instant disclosure may also be selected to provide combinations of one or more of any of the specified values of attenuation at 1550 nm, mode field diameter, and cable cutoff wavelength. By way of illustration, the relative refractive index profile across the core and cladding regions of the optical fibers of instant disclosure may be selected to provide an attenuation of less than 0.195 dB/km at 1550 nm and a mode field diameter greater than 12.4 μm at 1550 nm. The fibers may additionally or optionally have a cable cutoff wavelength of less than 1530 nm, for example.

The primary coating of the instant fibers may have a lower modulus than the secondary coating. The primary coating may be formed from a primary composition that includes a curable oligomer. The curable primary composition may also include monomers, a polymerization initiator, and one or more additives. Unless otherwise specified or implied herein, the weight percent (wt %) of a particular component in a curable primary composition refers to the amount of the component present in the curable primary composition on an additive-free basis. Generally, the weight percents of the monomer(s), oligomer(s), and initiator(s) sum to 100%. When present, the amount of an additive is reported herein in units of parts per hundred (pph) relative to the combined amounts of monomer(s), oligomer(s), and initiator(s). An additive present at the 1 pph level, for example, is present in an amount of 1 g for every 100 g of combined monomer(s), oligomer(s), and initiator(s).

The oligomer of the curable primary composition may be a urethane acrylate oligomer, or a urethane acrylate oligomer that includes one or more isocyanate groups, or a urethane acrylate oligomer that includes one or more aliphatic isocyanate groups, or a urethane acrylate oligomer that includes a single isocyanate group, or a urethane acrylate oligomer that includes a single aliphatic isocyanate group.

The oligomer may be an acrylate-terminated oligomer. Preferred acrylate-terminated oligomers for use in the primary curable compositions include BR3731, BR3741, BR582 and KWS4131, from Dymax Oligomers & Coatings; polyether urethane acrylate oligomers (e.g., CN986, available from Sartomer Company); polyester urethane acrylate oligomers (e.g., CN966 and CN973, available from Sartomer Company, and BR7432, available from Dymax Oligomers & Coatings); polyether acrylate oligomers (e.g., GENOMER 3456, available from Rahn AG); and polyester acrylate oligomers (e.g., EBECRYL 80, 584 and 657, available from Cytec Industries Inc.). Other oligomers are described in U.S. Pat. Nos. 4,609,718; 4,629,287; and 4,798,852, the disclosures of which are hereby incorporated by reference in their entirety herein.

The oligomer of the primary curable composition may include a soft block with a number average molecular weight ($M_n$) of about 4000 g/mol or greater. Examples of such oligomers are described in U.S. patent application Ser. No. 09/916,536, the disclosure of which is incorporated by reference herein in its entirety. The oligomers may have flexible backbones, low polydispersities, and/or may provide cured coatings of low crosslink densities.

The oligomers may be used singly, or in combination to control coating properties. The total oligomer content of the primary curable composition may be between about 5 wt % and about 95 wt %, or between about 25 wt % and about 65 wt %, or between about 35 wt % and about 55 wt %.

The monomer component of the primary curable composition may be selected to be compatible with the oligomer, to provide a low viscosity formulation, and/or to increase the refractive index of the primary coating. The monomer may also be selected to provide curable compositions having decreased gel times and low moduli. The primary curable composition may include a single monomer or a combination of monomers. The monomers may include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof. The monomer component may include compounds having the general formula $R_2-R_1-O-(CH_2CH_3CH-O)_n-COCH=CH_2$, where $R_1$ and $R_2$ are aliphatic, aromatic, or a mixture of both, and n=1 to 10, or $R_1-O-(CH_2CH_3CH-O)_n-COCH=CH_2$, where $R_1$ is aliphatic or aromatic, and n=1 to 10. Representative examples include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

The monomer component of the primary curable composition may also include a multifunctional (meth)acrylate. As used herein, the term "(meth)acrylate" means acrylate or methacrylate. Multifunctional (meth)acrylates are (meth)acrylates having two or more polymerizable (meth)acrylate moieties per molecule. The multifunctional (meth)acrylate may have three or more polymerizable (meth)acrylate moieties per molecule. Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), and dipentaerythritol pentaacrylate (e.g., PHOTOMER 4399, IGM Resins, and SR399, Sartomer Company, Inc.). A multifunctional (meth)acrylate may be present in the primary curable composition at a concentration of from 0.05-15 wt %, or from 0.1-10 wt %.

The monomer component of the primary curable compositions may include an N-vinyl amide such as an N-vinyl lactam, or N-vinyl pyrrolidinone, or N-vinyl caprolactam. The N-vinyl amide monomer may be present in the primary curable composition at a concentration from 0.1-40 wt %, or from 2-10 wt %.

The curable primary coating composition may include one or more monofunctional (meth)acrylate monomers in an amount from 5-95 wt %, or from 0-75 wt %, or from 40-65 wt %. The curable primary coating composition may include one or more monofunctional aliphatic epoxy acrylate monomers in an amount from 5-40 wt %, or from 10-30 wt %.

The monomer component of the primary curable composition may include a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono(meth)acrylates, such as poly(ethylene glycol) monoacrylate, polypropylene glycol) monoacrylate, and poly(tetramethylene glycol) monoacrylate (each available from Monomer, Polymer & Dajac Labs); 2-hydroxyethyl (meth)acrylate, 3-hydroxypropyl (meth)acrylate, and 4-hydroxybutyl (meth)acrylate (each available from Aldrich).

The hydroxyfunctional monomer may be present in an amount sufficient to improve adhesion of the primary coating to the optical fiber. The hydroxyfunctional monomer may be present in the primary curable composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the primary coating. Hydroxyfunctional monomers are described in more detail in U.S. Pat. No. 6,563,996, the disclosure of which is hereby incorporated by reference in its entirety.

The total monomer content of the primary curable composition may be between about 5 wt % and about 95 wt %, or between about 30 wt % and about 75 wt %, or between about 40 wt % and about 65 wt %.

The monomer present in the primary curable composition may include an N-vinyl amide monomer at a concentration of 0.1-40 wt % or 2-10 wt % in combination with one or more difunctional urethane acrylate oligomers in an amount from 5 to 95 wt %, or from 25 to 65 wt % or from 35 to 55 wt %.

The primary coating composition may include one or more monofunctional (meth)acrylate monomers in an amount of from about 5 to 95 wt %; an N-vinyl amide monomer in an amount of from about 0.1 to 40 wt %; and one or more difunctional urethane acrylate oligomers that include a polyol and an isocyanate, where the oligomer is present in an amount of from about 5 to 95 wt %. The polyol in the oligomer may be a polypropylene glycol and the isocyanate may be an aliphatic diisocyanate.

The primary coating composition may include one or more monofunctional (meth)acrylate monomers in an amount of from about 40 to 65% by weight; an N-vinyl amide monomer in an amount of from about 2 to 10% by weight; and one or more polypropylene glycol-based difunctional urethane acrylate oligomers in an amount of from about 35 to 60% by weight.

The glass transition temperature of the primary coating may influence the microbend performance of the fibers at low temperature. It may be desirable for the primary coating to have a glass transition temperature below the lowest projected use temperature of the coated optical fiber. The glass transition temperature of the primary coating may be −15° C. or less, or −25° C. or less, or −30° C. or less.

The primary coating may have a lower modulus of elasticity than the secondary coating. A low modulus may allow the primary coating to protect the core and cladding by efficiently dissipating internal stresses that arise when the exterior of the fiber is bent or subjected to an external force. The in situ modulus of the primary coating may be 0.50 MPa or less, or 0.25 MPa or less, or 0.20 MPa or less, or 0.19 MPa or less, or 0.18 MPa or less, or 0.17 MPa or less, or 0.16 MPa or less, or 0.15 MPa or less.

The primary curable composition may also include polymerization initiators, antioxidants, and other additives familiar to the skilled artisan.

The polymerization initiator may facilitate initiation of the polymerization process associated with the curing of the primary composition to form the primary coating. Polymerization initiators may include thermal initiators, chemical initiators, electron beam initiators, and photoinitiators. For many (meth)acrylate-based coating formulations, photoinitiators such as ketonic photoinitiating additives and/or phosphine oxide additives may be employed. When used in the photoformation of the primary coating of the present disclosure, the photoinitiator is present in an amount sufficient to provide rapid ultraviolet curing.

Suitable photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl)diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The photoinitiator component of the primary curable composition may consist of a single photoinitiator or a combination of two or more photoinitiators. The total photoinitiator content of the primary curable composition may be up to about 10 wt %, or between about 0.5 wt % and about 6 wt %.

In addition to monomer(s), oligomer(s), and polymerization initiator(s), the primary curable composition may include other additives such as an adhesion promoter, a strength additive, a reactive diluent, an antioxidant, a catalyst, a stabilizer, an optical brightener, a property-enhancing additive, an amine synergist, a wax, a lubricant, and/or a slip agent. Some additives may operate to control the polymerization process, thereby affecting the physical properties (e.g., modulus, glass transition temperature) of the polymerization product formed from the primary curable composition. Other additives may affect the integrity of the polymerization product of the primary curable composition (e.g., protect against de-polymerization or oxidative degradation). For example, the primary curable composition may include a carrier, as described in U.S. Pat. Nos. 6,326,416 and 6,539,152, the disclosures of which are hereby incorporated by reference herein.

It may be desirable to include an adhesion promoter in the primary curable composition. An adhesion promoter is a compound that may facilitate adhesion of the primary coating and/or primary composition to the cladding. Suitable adhesion promoters include alkoxysilanes, organotitanates, and zirconates. Representative adhesion promoters include 3-mercaptopropyl-trialkoxysilane (e.g., 3-MPTMS, available from Gelest (Tullytown, Pa.)); bis(trialkoxysilyl-ethyl) benzene; acryloxypropyltrialkoxysilane (e.g., (3-acryloxypropyl)-trimethoxysilane, available from Gelest), methacryloxypropyltrialkoxysilane, vinyltrialkoxysilane, bis (trialkoxysilylethyl)hexane, allyltrialkoxysilane, styrylethyltrialkoxysilane, and bis(trimethoxysilylethyl)benzene (available from United Chemical Technologies (Bristol, Pa.)); see U.S. Pat. No. 6,316,516, the disclosure of which is hereby incorporated by reference in its entirety herein.

The adhesion promoter may be present in the primary composition in an amount between about 0.02 pph to about 10 pph, or between about 0.05 pph and 4 pph, or between about 0.1 pph to about 2 pph, or between about 0.1 pph to about 1 pph.

The primary coating composition may also include a strength additive, as described in U.S. Published Patent Application No. 20030077059, the disclosure of which is hereby incorporated by reference herein in its entirety. Representative strength additives include mercapto-functional compounds, such as N-(tert-butoxycarbonyl)-L-cysteine methyl ester, pentaerythritoltetrakis(3-mercaptopropionate), (3-mercaptopropyl)-trimethoxysilane; (3-mercaptopropyl) trimethoxysilane, and dodecyl mercaptan. The strength additive may be present in the primary curable composition in an amount less than about 1 pph, or in an amount less than about 0.5 pph, or in an amount between about 0.01 pph and about 0.1 pph.

A representative antioxidant is thiodiethylene bis[3-(3,5-di-tert-butyl)-4-hydroxy-phenyl) propionate] (e.g., IRGANOX 1035, available from BASF).

It may be desirable to include an optical brightener in the primary curable composition. Representative optical brighteners include TINOPAL OB (available from BASF); Blankophor KLA (available from Bayer); bisbenzoxazole compounds; phenylcoumarin compounds; and bis(styryl)

biphenyl compounds. The optical brightener may be present in the primary curable composition at a concentration of 0.005 pph-0.3 pph.

It may also be desirable to include an amine synergist in the primary curable composition. Representative amine synergists include triethanolamine; 1,4-diazabicyclo[2.2.2]octane (DABCO), triethylamine, and methyldiethanolamine. The amine synergist may be present at a concentration of 0.02 pph-0.5 pph.

The secondary coating is designed to protect the fiber from mechanical damage and the external environment. The secondary coating may be formed from a curable secondary composition that includes one or more monomers. The monomers may include ethylenically unsaturated compounds. The curable secondary composition may also include one or more oligomers, one or more polymerization initiators, and one or more additives as described more fully herein.

Unless otherwise specified or implied herein, the weight percent (wt %) of a particular component in a curable secondary composition refers to the amount of the component present in the curable secondary composition on an additive-free basis. Generally, the weight percents of the monomer(s), oligomer(s), and initiator(s) sum to 100%. When present, the amount of an additive is reported herein in units of parts per hundred (pph) relative to the combined amounts of monomer(s), oligomer(s), and initiator(s). An additive present at the 1 pph level, for example, is present in an amount of 1 g for every 100 g of combined monomer(s), oligomer(s), and initiator(s).

In order to reduce cost, the oligomer content of the secondary composition may be minimized. Relative to the prevailing secondary compositions known in the art, the oligomer content of the present secondary composition is particularly low. Oligomers may be present as a minority component or completely absent from the secondary composition of the present disclosure. The oligomer may be present in the secondary composition in an amount of about 3 wt % or less, or in an amount of about 2 wt % or less, or in an amount of about 1 wt % or less. The secondary composition may also be devoid of oligomers.

The monomer component of the curable secondary composition may include one or more monomers. The one or more monomers may be present in the secondary composition in an amount of 50 wt % or greater, or in an amount from about 75 wt % to about 99 wt %, or in an amount from about 80 wt % to about 99 wt % or in an amount from about 85 wt % to about 98 wt %.

The monomer component of the curable secondary composition may include ethylenically unsaturated compounds. The ethylenically unsaturated monomers may be monofunctional or polyfunctional. The functional groups may be polymerizable groups and/or groups that facilitate or enable crosslinking. In combinations of two or more monomers, the constituent monomers may be monofunctional, polyfunctional, or a combination of mono functional and polyfunctional compounds. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

Most suitable monomers are either commercially available or readily synthesized using reaction schemes known in the art. For example, most of the above-listed monofunctional monomers can be synthesized by reacting an appropriate alcohol or amide with an acrylic acid or acryloyl chloride.

In addition to functioning as a polymerizable moiety, monofunctional ethylenically unsaturated monomers may also be included in the curable secondary composition for other purposes. Monofunctional monomer components may, for example, influence the degree to which the cured product absorbs water, adheres to other coating materials, or behaves under stress.

Representative polyfunctional ethylenically unsaturated monomers include, without limitation, alkoxylated bisphenol A diacrylates, such as ethoxylated bisphenol A diacrylate, with the degree of alkoxylation being 2 or greater. The monomer component of the secondary composition may include ethoxylated bisphenol A diacrylate with a degree of ethoxylation ranging from 2 to about 30 (e.g. SR349 and SR601 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

The secondary composition may or may not include an oligomeric component. As indicated hereinabove, if present, oligomers are present as a minor constituent in the secondary composition. One or more oligomers may be present in the secondary composition. One class of oligomers that may be included in the secondary composition is ethylenically unsaturated oligomers. When employed, suitable oligomers may be monofunctional oligomers, polyfunctional oligomers, or a combination of a monofunctional oligomer and a polyfunctional oligomer. If present, the oligomer component of the secondary composition may include aliphatic and aromatic urethane (meth)acrylate oligomers, urea (meth)acrylate oligomers, polyester and polyether (meth)acrylate oligomers, acrylated acrylic oligomers, polybutadiene (meth)acrylate oligomers, polycarbonate (meth)acrylate oligomers, and melamine (meth)acrylate oligomers or combinations thereof.

The oligomeric component the secondary composition may include a difunctional oligomer. A difunctional oligomer may have a structure according to formula (I) below:

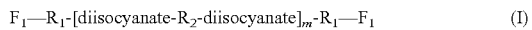

$$F_1-R_1-[\text{diisocyanate}-R_2-\text{diisocyanate}]_m-R_1-F_1 \quad (I)$$

where $F_1$ may independently be a reactive functional group such as acrylate, methacrylate, acrylamide, N-vinyl amide, styrene, vinyl ether, vinyl ester, or other functional group known in the art; $R_1$ may include, independently, $-C_{2-12}O-$, $-(C_{2-4}-O)_n-$, $-C_{2-12}O-(C_{2-4}-O)_n-$, $-C_{2-12}O-(CO-C_{2-5}O)_n-$, or $-C_{2-12}O-(CO-C_{2-5}NH)_n-$ where n is a whole number from 1 to 30, including, for example, from 1 to 10; $R_2$ may be a polyether, polyester, polycarbonate, polyamide, polyurethane, polyurea, or combination thereof; and m is a whole number from 1 to 10, including, for example, from 1 to 5. In the structure of formula (I), the diisocyanate moiety may be the residue formed from the reaction of a diisocyanate with $R_2$ and/or $R_1$. The term "independently" is used herein to indicate that each $F_1$ may differ from another $F_1$ and the same is true for each $R_1$.

The oligomer component of the curable secondary composition may include a polyfunctional oligomer. The polyfunctional oligomer may have a structure according to formula (II), formula (III), or formula (IV) set forth below:

$$\text{multiisocyanate-}(F_2-R_1-F_2)_x \quad (II)$$

$$\text{polyol-}[(\text{diisocyanate-}R_2\text{-diisocyanate})_m-R_1-F_2]_x \quad (III)$$

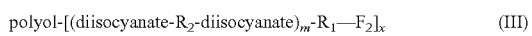

$$\text{multiisocyanate-}(R_1-F_2)_x \quad (IV)$$

where $F_2$ may independently represent from 1 to 3 functional groups such as acrylate, methacrylate, acrylamide, N-vinyl amide, styrene, vinyl ether, vinyl ester, or other functional groups known in the art; $R_1$ can include $-C_{2-12}O-$, $-(C_{2-4}-O)_n-$, $-C_{2-12}O-(C_{2-4}-O)_n-$, $-C_{2-12}O-(CO-C_{2-5}O)_n-$, or $-C_{2-12}O-(CO-C_{2-5}NH)_n-$ where n is a whole number from 1 to 10, including, for example, from 1 to 5; $R_2$ may be polyether, polyester, polycarbonate, polyamide, polyurethane, polyurea or combinations thereof; x is a whole number from 1 to 10, including, for example, from 2 to 5; and m is a whole number from 1 to 10, including, for example, from 1 to 5. In the structure of formula (II), the multiisocyanate group may be the residue formed from reaction of a multiisocyanate with $R_2$. Similarly, the diisocyanate group in the structure of formula (III) may be the reaction product formed following bonding of a diisocyanate to $R_2$ and/or $R_1$.

Urethane oligomers may be prepared by reacting an aliphatic or aromatic diisocyanate with a dihydric polyether or polyester, most typically a polyoxyalkylene glycol such as a polyethylene glycol. Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis. The presence of minor proportions of polyureas in the secondary coating composition is not considered detrimental to coating performance, provided that the diamines or polyamines employed in the synthesis are sufficiently nonpolar and saturated as to avoid compromising the moisture resistance of the system.

The secondary coating compositions may also contain a polymerization initiator to facilitate polymerization (curing) of the secondary composition after its application to a glass fiber or a glass fiber previously coated with a primary or other layer. Polymerization initiators suitable for use in the compositions may include thermal initiators, chemical initiators, electron beam initiators, microwave initiators, actinic-radiation initiators, and photoinitiators. For many acrylate-based coating formulations, photoinitiators, such as the known ketonic photoinitiating and/or phosphine oxide additives, may be used. When used in the compositions, the photoinitiator may be present in an amount sufficient to provide rapid ultraviolet curing. The photoinitiator may be present in an amount ranging from about 0.5 wt % to about 10 wt %, or from about 1.5 wt % to about 7.5 wt %, or in an amount of about 3 wt %.

The amount of photoinitiator is adjusted to promote radiation cure to provide reasonable cure speed without causing premature gelation of the coating composition. A desirable cure speed may be a speed sufficient to cause curing of the coating composition of greater than about 90%, or greater than 95%). As measured in a dose versus modulus curve, a cure speed for coating thicknesses of about 25-35 μm may be, for example, less than 1.0 J/cm² or less than 0.5 J/cm².

Suitable photoinitiators include, without limitation, 2,4,6-trimethylbenzoyl-diphenylphosphine oxide (e.g. Lucirin TPO); 1-hydroxycyclohexylphenyl ketone (e.g. Irgacure 184 available from BASF); (2,6-diethoxybenzoyl)-2,4,4-trimethylpentyl phosphine oxide (e.g. in commercial blends Irgacure 1800, 1850, and 1700, BASF); 2,2-dimethoxyl-2-phenyl acetophenone (e.g., Irgacure, 651, BASF); bis(2,4,6-trimethylbenzoyl)phenyl phosphine oxide (e.g., Irgacure 819, BASF); (2,4,6-triethylbenzoyl)diphenyl phosphine oxide (e.g., in commercial blend Darocur 4265, BASF); 2-hydroxy-2-methyl-1-phenylpropane-1-one (e.g., in commercial blend Darocur 4265, BASF) and combinations thereof.

In addition to the above-described components, the secondary coating composition can optionally include an additive or a combination of additives. Representative additives include, without limitation, antioxidants, catalysts, lubricants, low molecular weight non-crosslinking resins, adhesion promoters, and stabilizers. Additives may operate to control the polymerization process, thereby affecting the physical properties (e.g., modulus, glass transition temperature) of the polymerization product formed from the composition. Additives may affect the integrity of the polymerization product of the composition (e.g., protect against de-polymerization or oxidative degradation).

The secondary composition may include thiodiethylene bis(3,5-di-tert-butyl)-4-hydroxyhydrocinnamate (e.g., Irganox 1035, available from BASF) as an antioxidant. The secondary composition may include an acrylated acid adhesion promoter (such as Ebecryl 170 (available from UCB Radcure (Smyrna Ga.)). Other suitable materials for use in secondary coating materials, as well as considerations related to selection of these materials, are well known in the art and are described in U.S. Pat. Nos. 4,962,992 and 5,104,433, the disclosures of which are hereby incorporated by reference.

Even with low oligomer content, the present secondary compositions may result in a secondary coating material having high tensile strength and a high modulus of elasticity (Young's Modulus). The secondary coating may have a higher modulus of elasticity and higher glass transition temperature than the primary coating. The tensile strength of the polymerization product of the secondary composition of the present disclosure, when prepared in the form of cured rods, may be at least 50 MPa. When measured on cured coating rods, the modulus of elasticity of the cured product of the secondary composition may be in the range from about 1400 MPa to about 2200 MPa, or in the range from about 1700 MPa to about 2100 MPa. The in situ modulus of elasticity of the secondary coating may be 1200 MPa or greater, or 1500 MPa or greater, or 1800 MPa or greater.

High modulus secondary coatings may offer better protection of the fiber against mechanical damage and better microbend performance. However, high speed processing of high modulus secondary coatings in the draw tower may be a challenge because of an increased tendency to of the draw process to generate defects such as flat spots and wind induced point defects (WIPD) in the secondary coating that ultimately compromise fiber performance.

During the development of oligomer-free coatings, it was found that removal of the oligomer from the formulation, without modifying other components, resulted in a secondary coating with a modulus of ~2000 MPa. Such secondary coatings that may be difficult to process at high speeds in the draw tower. Accordingly, it may be desirable to compensate for the effect of removing the oligomer by formulating the secondary composition to include monomers with long flexible (e.g. ethoxylated) chains between functional groups. Long flexible chains may increase the distance between crosslinks, may decrease the crosslink density and may ultimately lower the modulus of the cured secondary coating. A potential drawback of such monomers is that they may have a lower glass transition temperature (Tg) and may tend to decrease the Tg of the cured secondary coating. Secondary coatings with low Tg may not be desirable because a low Tg may result in a material that is too soft at the time of application and may lead to defects during processing at high speed. Higher Tg secondary coatings may be harder at room temperature and may provide better mechanical protection to the optical fiber. If the Tg is too high, however, the coating may be sufficiently stiff to make the fiber more prone to defects during processing.

The secondary coating of the present disclosure may be designed to achieve a secondary coating with moderate Tg that imparts adequate mechanical protection and bend insensitivity to the optical fiber while still allowing the fiber to be processed defect-free in high speed draw towers. The Tg of cured rods prepared from the cured product of the secondary coating composition may be at least about 50° C. The glass transition temperature of the secondary coating may be at least 50° C., or at least 55° C., or at least 60° C., or between 55° C. and 65° C.

The secondary composition may be devoid of an oligomeric component and the monomeric component may include ethoxylated(4) bisphenol-A diacrylate monomer, ethoxylated(30) bisphenol-A diacrylate monomer, and epoxy diacrylate monomer. The ethoxylated(4) bisphenol-A diacrylate monomer may be present in an amount ranging from about 50 wt % to about 90 wt %, or from about 60 wt % to about 80 wt %, or and from about 70 wt % to about 75 wt %. The ethoxylated(30) bisphenol-A diacrylate monomer may be present in an amount ranging from about 5 wt % to about 20 wt %, or from about 7 wt % to about 15 wt %, or from about 8 wt % to about 12 wt %. The epoxy diacrylate monomer may be present in an amount of ranging from about 5 wt % to about 25 wt %, or from about 10 wt % to about 20 wt %, or from about 12 wt % to about 18 wt %.

The secondary composition may be devoid of an oligomeric component and the monomeric component may include ethoxylated(4) bisphenol-A diacrylate monomer, ethoxylated(10) bisphenol-A diacrylate monomer, and epoxy diacrylate monomer. The ethoxylated(4) bisphenol-A diacrylate monomer may be present in an amount ranging from about 30 wt % to about 80 wt %, or from about 40 wt % to about 70 wt %, or from about 50 wt % to about 60 wt %. The ethoxylated(10) bisphenol-A diacrylate monomer may be present in an amount ranging from about 10 wt % to about 50 wt %, or from about 20 wt % to about 40 wt %, or from about 25 wt % to about 35 wt %. The epoxy diacrylate monomer may be present in an amount ranging from about 5 wt % to about 25 wt %, or from about 10 wt % to about 20 wt %, or from about 12 wt % to about 18 wt %.

The secondary composition may be devoid of an oligomeric component, and the monomeric component may include ethoxylated(4) bisphenol-A diacrylate monomer, ethoxylated(10) bisphenol-A diacrylate monomer, ethoxylated(30) bisphenol-A diacrylate monomer, and epoxy diacrylate monomer. The ethoxylated(4) bisphenol-A diacrylate monomer may be present in an amount ranging from about 40 wt % to about 80 wt %, or from about 60 wt % to about 70 wt %. The ethoxylated(10) bisphenol-A diacrylate monomer may be present in an amount ranging from about 1 wt % to about 30 wt %, or from about 5 wt % to about 10 wt %. The ethoxylated(30) bisphenol-A diacrylate monomer may be present in an amount ranging from about 5 wt % to about 20 wt %, or in an amount of about 10 wt %. The epoxy diacrylate monomer may be present in an amount ranging from about 5 wt % to about 25 wt %, or in an amount of about 15 wt %.

The secondary composition may be devoid of an oligomeric component and the monomeric component may include ethoxylated (10) bisphenol A diacrylate monomer, tripropylene glycol diacrylate monomer, ethoxylated (4) bisphenol A diacrylate monomer, and epoxy diacrylate monomer. The ethoxylated (10) bisphenol A diacrylate monomer may be present in an amount ranging from about 10 wt % to about 50 wt %. The tripropylene glycol diacrylate monomer may be present in an amount from about 5 wt % to about 40 wt %. The ethoxylated (4) bisphenol A diacrylate monomer may be present in an amount from about 10 wt % to about 55 wt %. The epoxy diacrylate monomer may be present in an amount up to about 15 wt %.

The secondary composition may comprise from about 40 wt % to 80 wt % of ethoxylated (4) bisphenol A monomer, from about 0 wt % to about 30% of ethoxylkated (10) bisphenol A monomer, from about 0 wt % to about 25% wt % of ethoxylated (30) bisphenol A monomer, from about 5 wt % to 18 wt % of epoxy acrylate, from about 0 wt % to 10 wt % of tricyclodecane dimethanoldiacrylate monomer, from about 0.1 wt % to 40% of one or more photoinitiators, from about 0 pph to 5 pph by weight of slip additive; and from 0 pph to about 5 pph by weight of an antioxidant. The secondary composition may further comprise 3% or less oligomer, or 1% or less oligomer, or may be devoid of oligomer. The epoxy acrylate may be an epoxy acrylate monomer. The epoxy acrylate may be bisphenol A epoxy diacrylate. The epoxy acrylate may be an unmodified epoxy acrylate, for example an epoxy acrylate which is not modified with fatty acid, amine, acid, or aromatic functionality. Such compositions may have a viscosity at 45° C. of at least about 3 Poise and when cured, may exhibit a Young's modulus of from about 1400 MPa to about 2100 MPa. The compositions may exhibit a glass transition temperature of at least about 55° C. The monomeric component may include an alkoxylated bisphenol A diacrylate monomer having at least 10 alkoxy groups.

The primary and secondary curable compositions may be applied as coatings to the outer surface of the cladding using conventional processes, such as on a draw tower. In the drawing process, a specially prepared, cylindrical glass optical fiber preform is locally and symmetrically heated to a temperature of about 2000° C. The preform may be heated by feeding it into and through a furnace. As the preform is heated, a glass optical fiber may be drawn from the molten material. The primary and secondary curable compositions may be applied to the glass fiber after it has been drawn from the preform, including immediately after cooling. The curable compositions may then be cured to produce the coated optical fiber. The method of curing may be thermal, chemical, or radiation induced, such as by exposing the applied curable composition on the glass fiber to ultraviolet light, actinic radiation, microwave radiation, or an electron beam, depending upon the nature of the coating composition(s) and polymerization initiator being employed. It is frequently advantageous to apply both a primary curable composition and a secondary curable compositions in sequence following the draw process. Methods of applying dual layers of curable compositions to a moving glass fiber are disclosed in U.S. Pat. Nos. 4,474,830 and 4,585,165, the disclosures of which are hereby incorporated by reference herein. The primary curable composition may be applied and cured to form the primary coating material before applying and curing the secondary curable composition to form the secondary coating.

EXAMPLES

Representative fibers in accordance with the present disclosure were fabricated and tested to demonstrate selected advantages thereof. The fibers are of the type depicted in FIG. 1 and included a central core region with radius $r_0$ and refractive index percent profile $\Delta_0$, a first core region with outer radius $r_1$ and refractive index percent profile $\Delta_1$, an inner cladding region with outer radius $r_2$ and refractive index percent profile $\Delta_2$, an outer cladding region with outer radius $r_3$ and refractive index percent profile $\Delta_3$, a primary coating with outer radius $r_4$, and a secondary coating with outer radius $r_5$.

Figure 3:
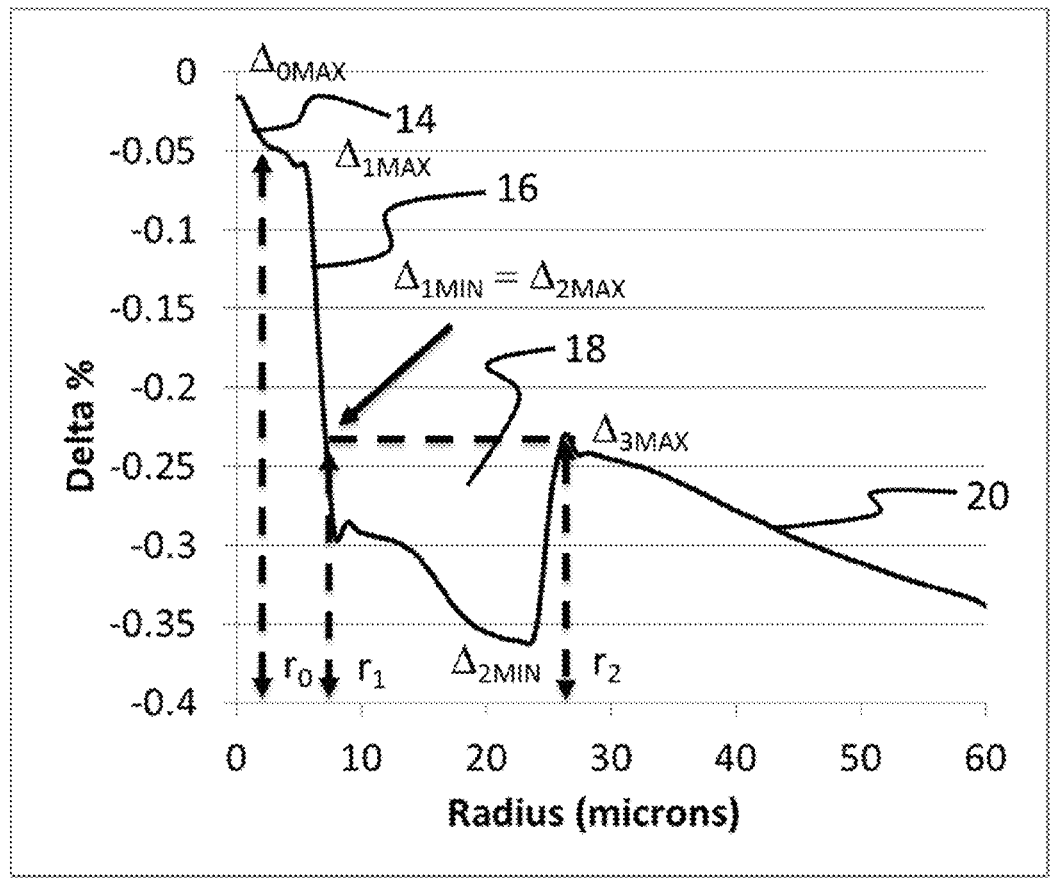
FIG. 3 schematically depicts the refractive index profile of a sample fiber.

The central core region, first core region, inner cladding region and outer cladding region were common to all of the fibers. The refractive index profile across the central core region, first core region, inner cladding region, outer cladding region and radial positions $r_0$, $r_1$, and $r_2$ for one of the fibers is shown in FIG. 3. Each of the fibers had an outer cladding radius $r_3$ of 62.5 μm. The profile was substantially the same for all of the fibers prepared for this example.

Fiber Coatings

The fibers were prepared in a conventional drawing process. During the drawing, the curable primary and secondary compositions were applied and cured with UV radiation. The drawing station was equipped with two secondary UV lamps and one primary UV lamp to cure the compositions to make the coatings. A series of 14 fiber samples was prepared and tested. The thicknesses and/or compositions of the primary and/or secondary coatings were varied in the series of fiber samples to assess the effect of coating characteristics on the optical and mechanical performance of the fibers. The fibers are listed herein by a sample number in the range from 1-14. Fibers 1-6 and 11-14 are illustrative fibers that include a primary or secondary coating in accordance with the present disclosure. Fibers 7-10 are comparative fibers that include coatings from the prior art.

Representative curable compositions A-H for the primary coating are shown below. Curable composition I is a comparative composition based on an existing commercial formulation.

| Component | A | B | C | D | E | F | G | H | I |
|---|---|---|---|---|---|---|---|---|---|
| Photomer 4003 (wt %) | 41.5 | 0 | 61.5 | 41.5 | 46.5 | 46.5 | 45.5 | 47 | 41.5 |
| Photomer 4960 (wt %) | 0 | 41.5 | 0 | 0 | 0 | 0 | 0 | 0 | 0 |
| BR3741 (wt %) | 55 | 55 | 35 | 55 | 50 | 50 | 50 | 50 | 52 |
| N-vinyl caprolactam (wt %) | 2 | 2 | 2 | 2 | 2 | 2 | 2 | 1.5 | 0 |
| Caprolactone Acrylate (wt %) | 0 | 0 | 0 | 0 | 0 | 0 | 0 | 0 | 2 |
| Irgacure 819 (wt %) | 0 | 0 | 0 | 0 | 0 | 0 | 0 | 0 | 1.5 |
| TPO (wt %) | 1.5 | 1.5 | 1.5 | 1.5 | 1.5 | 1.5 | 2.5 | 1.5 | 0 |
| (3-acryloxypropyl) trimethoxysilane (pph) | 1 | 1 | 1 | 1 | 1 | 0.8 | 0.8 | 0.8 | 1 |
| Irganox 1035 (pph) | 1 | 1 | 1 | 1 | 1 | 1 | 1 | 1 | 1 |
| Pentaerythritol mercaptopropionate (pph) | 0.03 | 0.03 | 0.03 | 0.03 | 0.03 | 0.03 | 0.03 | 0.03 | 0.03 |
| Uvitex OB (pph) | 0.05 | 0 | 0 | 0 | 0 | 0 | 0 | 0 | 0 |

Photomer 4003 is an ethoxylated nonyl phenol acrylate available from IGM Resins (now available as Photomer 4066). Photomer 4096 is a propoxylated nonyl phenol acrylate available from IGM Resins. BR3741 is an aliphatic polyether urethane acrylate oligomer available from Dymax Oligomers and Coatings. N-vinyl caprolactam is available from ISP Technologies, Inc. Caprolactone acrylate is a monofunctional acrylate available from Sartomer (SR495). IRGACURE 819 is a photoinitiator available from BASF. TPO is a photoinitiator available from BASF. IRGANOX 1035 is an antioxidant available from BASF. (3-acryloxypropyl) trimethoxysilane is an adhesion promoter available from Gelest. Pentaerythritol mercaptopropionate is available from Aldrich. UVITEX OB is an optical brightener available from BASF. The oligomer and monomer(s) were blended together for at least 10 minutes at 60° C. Photoinitiator(s) and additives were then added, and blending was continued for one hour. Finally, the adhesion promoter was added, and blending was continued for 30 minutes. The resulting solution was ultimately applied to the fiber and UV-cured to form a primary coating.

Representative curable compositions J-L for the secondary coating are shown below. Composition M is a comparative composition based on an existing commercial formulation.

| Component | J | K | L | M |
|---|---|---|---|---|
| SR601/Photomer4028 (wt %) | 72 | 52 | 72 | 82 |
| CD9038 (wt %) | 10 | 0 | 10 | 0 |
| Photomer3016 (wt %) | 15 | 15 | 15 | 5 |
| SR602 (wt %) | 0 | 30 | 0 | 0 |
| KWS4131 (wt %) | 0 | 0 | 0 | 10 |
| Irgacure 184 (wt %) | 1.5 | 1.5 | 1.5 | 1.5 |
| TPO (wt %) | 1.5 | 1.5 | 1.5 | 1.5 |
| DC190 Fluid slip additive (pph) | 0 | 0 | 1 | 0 |
| Irganox 1035 (pph) | 0.5 | 1 | 1 | 0.5 |

SR601/Photomer 4028 is an ethoxylated (4)bisphenol A monomer available from Sartomer or IGM Resins. CD9038 is an ethoxylated (30)bisphenol A monomer available from Sartomer. Photomer 3016 is an epoxy diacrylate monomer available from IGM Resins. SR602 is an ethoxylated (10)bisphenol A monomer available from Sartomer. KWS4131 is a polyether-urethane diacrylate oligomer available from Dymax Oligomers and Coatings. IRGACURE 184 is a photoinitiator available from BASF. TPO is a photoinitiator available from BASF. DC190 is a fluid slip additive available from Dow Corning. IRGANOX 1035 is an antioxidant available from BASF. Secondary compositions applied to the fibers of this example were prepared with the listed components using commercial blending equipment. The monomer components were weighed, introduced into a heated kettle, and blended together at a temperature within the range of from about 50° C. to 65° C. Blending was continued until a homogenous mixture was obtained. Next, the photoinitiator was weighed and introduced into the homogeneous solution while blending. Finally, the remaining components were weighed and introduced into the solution while blending. Blending was continued until a homogeneous solution was again obtained. The homogeneous solution was ultimately applied to the fiber and cured with UV radiation to form a secondary coating.

Test Methods

Primary In-situ Modulus

A six-inch fiber sample was used for this measurement. A one-inch section from the center of the six-inch sample was window stripped and wiped with isopropyl alcohol. The sample was mounted on a sample holder/alignment stage equipped with 10 mm×5 mm aluminum tabs to which the sample was glued. Two tabs were set so that the 10 mm length was laid horizontally with and a 5 mm gap between two tabs. The fiber was laid horizontally on the sample holder across the tabs. The coated end of the fiber was positioned on one tab and extended halfway into the 5 mm space between the tabs and the stripped glass was positioned over the other half of the 5 mm gap and on the other tab. The sample was lined up and then moved out of the way so that a small dot of glue could be applied to the half of each tab closest to the 5 mm gap. The fiber was then brought back over the tabs and centered. The alignment stage was then raised until the glue just touched the fiber. The coated end was then pulled through the glue such that the majority of the sample in the 5 mm gap between the tabs was stripped glass. The very tip of the coated end was left extended beyond the glue on the tab so that the region to be measured was left exposed. The sample was left to dry. The length of fiber fixed to the tabs was trimmed to 5 mm. The coated length embedded in glue, the non-embedded length (between the tabs), and the end-face primary diameter were measured.

Measurements were performed on the Rheometrics DMTA IV at a constant strain of 9e-6 1/s for a time of forty-five minutes at room temperature (~21° C.). The gauge length was 15 mm. Force and the change in length were recorded and used for the calculation of primary modulus. Samples were prepared by removing any epoxy from the tabs that would interfere with the 15 mm clamping length to insure there was no contact with the fiber and that the sample was secured squarely to the clamps. Once the instrument force was zeroed out, the non-coated end was mounted to the lower clamp (measurement probe). The tab containing the coated end of the fiber was mounted to the upper (fixed) clamp. The test was then executed and the sample was removed once the analysis was completed.

Preparation of Fiber Tube-off Samples

A 0.0055 miller stripper was clamped down approximately 1 inch from the end of the coated fiber. This one-inch region of fiber was plunged into a stream of liquid nitrogen and held for 3 seconds. The fiber was then removed from the stream of liquid nitrogen and quickly stripped. The stripped end of the fiber was then inspected. If coating remained on the glass, the sample was prepared again. The result was a hollow tube with primary and secondary coating. The glass, primary and secondary coating diameter are measured from the end-face of the un-stripped fiber.

Secondary In-situ Modulus

The fiber tube-off samples were run using the Rheometrics DMTA IV instrument at a sample gauge length 11 mm. The width, thickness, and length were determined and provided as input to the operating software of the instrument. The sample was mounted and run using a time sweep program at ambient temperature (21° C.) using the following parameters:
Frequency: 1 Rad/sec
Strain: 0.3%
Total Time=120 sec.
Time Per Measurement=1 sec
Initial Static Force=15.0 [g]
Static>Dynamic Force by=10.0 [%]
Once completed, the last five E' (storage modulus) data points were averaged. Each sample was run three times (fresh sample for each run) for a total of fifteen data points. The averaged value of the three runs was reported.

Results

The coating formulations applied to each of the fiber samples of this example are listed below. The in situ moduli for selected primary and secondary coatings were determined and are also reported. The outer diameter $r_4$ of the primary coating and the outer diameter $r_5$ of secondary coating are also listed. The glass transition temperatures for the primary coatings of the fibers were not directly measured. Based on separate tests performed using the same primary coating formulations in the absence of a secondary coating, the expected glass transition temperatures for primary compositions F and I were −55° C. and −45° C., respectively.

| Fiber | Primary Composition | Primary in situ Modulus (MPa) | $r_4$ (μm) | Secondary Composition | Secondary in situ Modulus (MPa) | $r_5$ (μm) |
|---|---|---|---|---|---|---|
| 1  | F | 0.103 | 190 | J |      | 246 |
| 2  | F |       | 188 | J |      | 244 |
| 3  | F |       | 174 | J |      | 244 |
| 4  | F | 0.169 | 195 | L | 1630 | 251 |
| 5  | F | 0.160 | 194 | L | 1643 | 250 |
| 6  | F | 0.136 | 192 | L | 1658 | 247 |
| 7  | I | 0.200 | 194 | M |      | 244 |
| 8  | I | 0.223 | 193 | M |      | 244 |
| 9  | I |       | 179 | M |      | 243 |
| 10 | I |       | 179 | M | 1530 | 243 |
| 11 | F |       | 172 | J |      | 239 |
| 12 | F |       | 170 | J |      | 242 |
| 13 | F |       | 190 | J |      | 245 |
| 14 | F |       | 193 | J |      | 247 |

Several performance attributes of each of illustrative fibers 1-6 and 12-14 were measured and compared to the performance of comparative fibers 7-10. The measured performance attributes included mode field diameter (MFD), attenuation at a wavelength of 1550 nm, microbending losses at a wavelength of 1550 nm as determined by a wire drum mesh test, cable cutoff wavelength, effective area ($A_{eff}$) at a wavelength of 1550 nm, dispersion at a wavelength of 1550 nm, and macrobending losses at a wavelength of 1550 nm as determined by mandrel wrap tests using a 20 mm mandrel and a 32 mm mandrel. A summary of the results is shown below.

| Fiber | MFD at 1550 nm (μm) | $A_{eff}$ at 1550 nm (μm²) | Dispersion at 1550 nm (ps/nm/km) | Attenuation at 1550 nm (dB/km) | Cable Cutoff (nm) |
|---|---|---|---|---|---|
| 1  | 13.8  | 153.9 | 20.87 | 0.191 | 1478 |
| 2  | 13.7  | 150.6 | 20.85 | 0.155 | 1496 |
| 3  | 14    | 157.3 | 20.86 | 0.163 | 1437 |
| 4  | 13.81 | 159.1 | 20.82 | 0.171 | 1474 |
| 5  | 13.26 | 143.9 | 20.44 | 0.176 | 1498 |
| 6  | 13.86 |       |       |       | 1269 |
| 7  | 13.59 | 148.1 | 20.74 | 0.156 | 1464 |
| 8  | 13.95 | 155.9 | 20.77 | 0.182 | 1460 |
| 9  | 13.93 | 155.0 | 20.70 | 0.189 | 1452 |
| 10 | 13.93 | 155.0 | 20.70 | 0.189 | 1452 |
| 11 | 12.5  | 124.5 | 20.63 | 0.160 | 1493 |
| 12 | 13.26 | 137.6 | 19.99 | 0.188 | 1249 |
| 13 | 12.88 | 131.5 | 20.70 | 0.164 | 1468 |
| 14 | 12.98 | 136.1 | 21.36 | 0.172 | 1449 |

| Fiber | 1550 nm Wire Drum Induced Attenuation (dB/km) | 20 mm macrobend (dB/T) | 32 mm macrobend (dB/T) |
|---|---|---|---|
| 1  | 0.074 | 21.62 | 0.36 |
| 2  | 0.077 | 8.19  | 0.02 |
| 3  | 0.437 | 18.36 | 0.07 |
| 4  | 0.219 | 14.00 |      |
| 5  | 0.083 | 6.73  | 0.26 |
| 6  | 0.134 |       |      |
| 7  | 0.484 | 8.98  | 0.03 |
| 8  | 0.812 | 20.56 | 0.46 |
| 9  | 2.143 | 36.52 | 0.47 |
| 10 | 2.064 | 36.52 | 0.47 |
| 11 | 0.03  |       |      |
| 12 | 0.229 |       |      |
| 13 | 0.018 |       |      |
| 14 | 0.008 |       |      |

The results indicate that illustrative fibers 1-6 and 11-14 provide significantly lower microbending losses at 1550 nm than comparative fibers 7-10 while maintaining similar $A_{eff}$ and similar mode field diameter. Also of note is the outstanding performance of fibers within the scope of the present disclosure having thin primary coatings. Fibers 3, 11, and 12, for example, have primary coatings with outside diameters of less than 175 μm and provide lower microbending losses than comparative fibers with much thicker primary coatings (e.g. fibers 7 and 8). When the thickness of the primary coating of the comparative fibers was reduced to a level comparable to illustrative fibers 3, 11, and 12, significantly higher microbending losses were observed (compare fibers 9 and 10 (which have a 179 μm outer diameter for the primary coating) with fibers 3, 11, and 12).

The ability of the illustrative fibers to resist microbending losses with thin primary coatings provides at least two benefits. First, for a given overall fiber diameter (as measured by the outer diameter of the secondary coating), a thinner primary coating permits use of a thicker secondary coating. A thicker secondary coating yields greater mechanical integrity and puncture resistance. Second, for a given secondary coating thickness, a thinner primary coating yields a smaller overall fiber diameter. Smaller fiber diameters are advantageous because they permit more compact bundles when multiple fibers are assembled.

It will be apparent to those skilled in the art that various modifications and variations can be made to the exemplary embodiments without departing from the intended spirit and scope encompassed by the description. Thus it is intended that the scope encompassed by the exemplary embodiments covers all modifications and variations that coincide with the scope of the appended claims and their equivalents.

What is claimed is:

1. An optical waveguide fiber comprising:
    a core having a radius $r_1$ in the range 4.8 μm≤$r_1$≤10 μm and a relative refractive index percent profile $\Delta_1(r)$ in % measured relative to pure silica, said relative refractive index percent profile $\Delta_1(r)$ having a maximum $\Delta_{1MAX}$ in the range −0.15%≤$\Delta_{1MAX}$≤0.2%;
    a cladding;
    a primary coating surrounding and directly adjacent said cladding, said primary coating having an in situ modulus of less than about 0.20 MPa and an outer diameter less than 190 μm; and
    a secondary coating surrounding and directly adjacent to said primary coating, said secondary coating having an in situ modulus of greater than about 1500 MPa;

wherein said relative refractive index percent profiles $\Delta_1(r)$ and said primary and secondary coatings are configured such that said optical waveguide fiber exhibits an effective area greater than 130 μm² at a wavelength of 1550 nm and a wire mesh drum microbending loss less than 0.4 dB/km at a wavelength of 1550 nm.

2. The fiber of claim 1, wherein said core includes a central region having a radius $r_0 \leq 2$ μm and a relative refractive index percent profile $\Delta_0(r)$ in % measured relative to pure silica having a maximum $\Delta_{0MAX}$, said maximum $\Delta_{0MAX}$ exceeding said maximum $\Delta_{1MAX}$.

3. The fiber of claim 1, wherein said core exhibits an effective area $A_{eff}$ of at least 150 μm².

4. The fiber of claim 1, wherein said cladding includes an inner cladding region and an outer cladding region, said outer cladding regions surrounding said inner cladding region, said inner cladding region surrounding said core, said inner cladding region having a radius $r_2$ in the range 13 μm $\leq r_2 \leq$ 30 μm and a relative refractive index percent profile $\Delta_2(r)$ in % measured relative to pure silica, said relative refractive index percent profile $\Delta_2(r)$ having a minimum $\Delta_{2MIN}$ in the range $-0.7\% \leq \Delta_{2MIN} \leq -0.27\%$.

5. The fiber of claim 4, wherein said outer cladding region has a relative refractive index percent profile $\Delta_3(r)$ in % measured relative to pure silica in the range $(\Delta_{2MIN}-0.3)\% \leq \Delta_3(r) \leq (\Delta_{2MIN}+0.3)\%$.

6. The fiber of claim 1, wherein the outer diameter of said primary coating is less than 180 μm.

7. The fiber of claim 1, wherein said primary coating has an in situ modulus of less than 0.17 MPa.

8. The fiber of claim 1, wherein said primary coating comprises the cured product of a primary composition that includes an acrylate oligomer, a diacrylate oligomer, or a urethane acrylate oligomer.

9. The fiber of claim 8, wherein said primary composition further includes a monomer selected from the group consisting of (meth)acrylates, alkoxylated (meth)acrylates, epoxy (meth)acrylates, or N-vinyl amides.

10. The fiber of claim 8, wherein said primary composition further includes a monofunctional (meth)acrylate monomer and a multifunctional (meth)acrylate monomer.

11. The fiber of claim 8, wherein said primary composition further includes an (meth)acrylate monomer and an N-vinyl amide monomer.

12. The fiber of claim 8, wherein said primary composition comprises one or more monofunctional (meth)acrylate monomers in an amount of from about 5 to 95% by weight; an N-vinyl amide monomer in an amount of from about 0.1 to 40% by weight; and one or more difunctional urethane acrylate oligomers which comprise a polyol and an isocyanate, said oligomer present in an amount of from about 5 to 95% by weight, wherein the polyol in said oligomer is a polypropylene glycol and the isocyanate in said oligomer is an aliphatic diisocyanate.

13. The fiber of claim 8, wherein said primary composition comprises one or more monofunctional (meth)acrylate monomers in an amount of from about 40 to 65% by weight; an N-vinyl amide monomer in an amount of from about 2 to 10% by weight; and one or more polypropylene glycol-based difunctional urethane acrylate oligomers in an amount of from about 35 to 60% by weight.

14. The fiber of claim 1, wherein said secondary coating has an in situ modulus of greater than about 1600 MPa.

15. The fiber of claim 1, wherein said secondary coating is the cured product of a secondary composition that includes a monomer selected from the group consisting of acrylates, substituted acrylates, alkyl acrylates, alcohol-based acrylates, N-vinyl amides, styrenes, vinyl ethers, vinyl esters, and acid esters.

16. The fiber of claim 15, wherein said monomer comprises a bisphenol A diacrylate or an alkoxylated bisphenol A diacrylate.

17. The fiber of claim 15, wherein said secondary composition includes at least two diacrylate monomers.

18. The fiber of claim 15, wherein said secondary composition lacks an oligomer.

19. The fiber of claim 15, wherein said secondary composition further includes an acrylate or methacrylate oligomer, said acrylate or methacrylate oligomer being present in an amount of less than 3 wt %.

20. The fiber of claim 15, wherein said secondary composition comprises:
about 40 to 80% by weight of ethoxylated (4) bisphenol A monomer;
from about 0 to about 30% by weight of ethoxylkated (10) bisphenol A monomer;
from about 0 to about 25% by weight of ethoxylated (30) bisphenol A monomer; and
from about 5 to 18% by weight of epoxy acrylate.

21. The fiber of claim 1, wherein said wire mesh drum microbending loss is less than 0.2 dB/km at a wavelength of 1550 nm.

* * * * *